(12) United States Patent
Wei et al.

(10) Patent No.: US 9,887,959 B2
(45) Date of Patent: Feb. 6, 2018

(54) METHODS AND SYSTEM FOR ALLOCATING AN IP ADDRESS FOR AN INSTANCE IN A NETWORK FUNCTION VIRTUALIZATION (NFV) SYSTEM

(71) Applicant: Futurewei Technologies, Inc., Plano, TX (US)

(72) Inventors: Anni Wei, Shenzhen (CN); Zhixian Xiang, Frisco, TX (US); Lei Zhu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 345 days.

(21) Appl. No.: 14/830,489

(22) Filed: Aug. 19, 2015

(65) Prior Publication Data

US 2016/0057102 A1 Feb. 25, 2016

Related U.S. Application Data

(60) Provisional application No. 62/039,224, filed on Aug. 19, 2014.

(51) Int. Cl.
*H04L 29/12* (2006.01)
*H04L 12/931* (2013.01)

(52) U.S. Cl.
CPC .......... *H04L 61/2007* (2013.01); *H04L 49/70* (2013.01); *H04L 61/2061* (2013.01)

(58) Field of Classification Search
CPC .... H04L 61/2007; H04L 49/70; G06F 9/5077
USPC ........................................................ 709/226
See application file for complete search history.

(56) References Cited

U.S. PATENT DOCUMENTS

| | | | |
|---|---|---|---|
| 8,032,634 B1* | 10/2011 | Eppstein | ................ H04L 67/34 709/226 |
| 8,504,724 B1 | 8/2013 | Reeves et al. | |
| 8,751,691 B1 | 6/2014 | Brandwine et al. | |
| 2003/0053441 A1 | 3/2003 | Banerjee | |
| 2010/0005506 A1 | 1/2010 | Lum | |
| 2014/0032753 A1* | 1/2014 | Watanabe | ......... H04L 29/08549 709/224 |
| 2014/0201374 A1 | 7/2014 | Ashwood-Smith et al. | |
| 2014/0229945 A1 | 8/2014 | Barkai et al. | |
| 2014/0328317 A1* | 11/2014 | Park | ........................ H04W 8/26 370/331 |
| 2016/0321112 A1* | 11/2016 | Iwashina | ............... G06F 9/5072 |

* cited by examiner

*Primary Examiner* — Kevin Bates
*Assistant Examiner* — Chen-Liang Huang
(74) *Attorney, Agent, or Firm* — Futurewei Technologies, Inc.

(57) ABSTRACT

A method for allocating an IP address for an instance in a NFV system includes obtaining a first requirement of IP address allocation from VNFD by a first node in the NFV system. A second requirement of IP address allocation for the instance is determined according to the first requirement. Then the second requirement is sent to a second node in the NFV system that allocates the IP address for the instance.

20 Claims, 8 Drawing Sheets

METHODS AND SYSTEM FOR ALLOCATING AN IP ADDRESS FOR AN INSTANCE IN A NETWORK FUNCTION VIRTUALIZATION (NFV) SYSTEM

CROSS-REFERENCE TO RELATED APPLICATION

The present application claims priority to U.S. Provisional Patent Application No. 62/039,224, filed Aug. 19, 2014 and entitled "Methods and Systems for Virtual Network Function Component (VNFC) Instance IP Address Allocation," which is incorporated herein by reference as if reproduced in its entirety.

TECHNICAL FIELD

The present disclosure relates to telecommunications, and, in particular embodiments, to methods and system for allocating an IP address for an instance in a network function virtualization (NFV) system.

BACKGROUND

Network Function Virtualization (NFV) is an industry effort to transform the way that network operators architect networks by evolving standard IT virtualisation technology to consolidate many network equipment types onto industry standard high volume servers, switches and storage, with the goal of cost reduction and efficient network operation and performance. In non-virtualised networks, network functions (NFs) are implemented as a combination of vendor specific software and hardware. By contrast, in NFV environment, NFs are separated from the hardware they run on using virtual hardware abstraction to virtualize entire classes of NFs into building blocks that may be connected, or chained, together to create communication services.

SUMMARY

In one embodiment, a method for allocating an IP address for an instance in a network function virtualization (NFV) system is disclosed that includes obtaining, by a first node in the NFV system, a first requirement of IP address allocation for the instance from a virtualised network function descriptor (VNFD), determining, by the first node, a second requirement of IP address allocation for the instance according to the first requirement, and sending, by the first node, to a second node in the NFV system the second requirement, wherein the IP is allocated for the instance is based upon the second requirement.

In another embodiment, a system is disclosed that includes a memory that stores at least one range of IP addresses and a processor that receives a request for an IP address for an instance in a Network Function Virtualization (NFV) system. The processor allocates the IP address by obtaining a first requirement of IP address allocation for the instance from a virtualised network function descriptor (VNFD) and a second requirement of IP address allocation for the instance according to the first requirement. This system also includes an interface connected to the processor that sends a selected IP address to the instance based upon the second requirement.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

It should be understood at the outset that, although an illustrative implementation of one or more embodiments are provided below, the disclosed systems, apparatuses, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Figure 1:
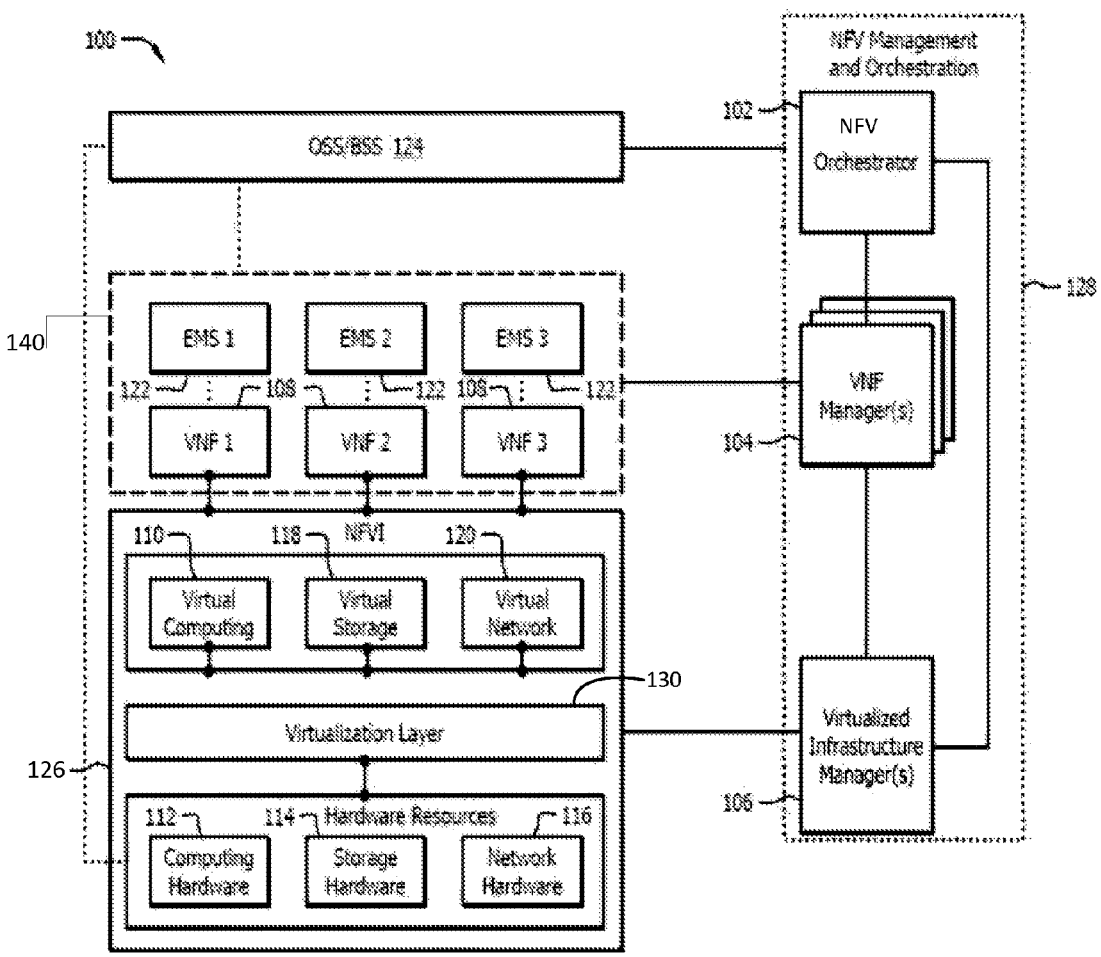
FIG. 1 illustrates a schematic diagram of an embodiment of an NFV system.

FIG. 1 is a schematic diagram of an embodiment of an NFV system 100. The NFV system 100 may comprise an NFV Management and Orchestration (NFV-MANO) entity 128, an NFV Infrastructure (NFVI) entity 126, a virtual function entity 140, and one or more Operations Support Systems (OSSs) and Business Support Systems (BSSs) (OSS/BSS) 124. The virtual function entity 140 may comprise a plurality of virtual network function (VNF) entities 108, a plurality of element management systems (EMSs) 122 that can be configured to perform the typical management functionality for the plurality of VNF entities 108. While three (3) VNF and EMS elements are shown in FIG. 1 it is expressly contemplated that any number of these elements may be found in a system, and the selection of three is purely for the purpose of convenience. Moreover, it is understood that alternate configurations are contemplated by this disclosure, e.g., where a plurality of VNF entities 108 are controlled by a single EMS.

The VNF entity 108 is a virtualisation of a network function in a non-virtualised network. For example, the network functions in the non-virtualised network may be 3GPP Evolved Packet Core (EPC) network elements, e.g. Mobility Management Entity (MME), Serving Gateway (SGW), Packet Data Network Gateway (PGW); elements in a home network, e.g. Residential Gateway (RGW); and conventional network functions, e.g. Dynamic Host Configuration Protocol (DHCP) servers, firewalls, etc. The VNF entity 108 can be composed of one or more internal components, called virtualised network function components (VNFCs). Each VNFC provides a defined sub-set of that VNF's functionality, with the main characteristic that a single instance of this component maps 1:1 against a single virtualisation container. For example, one VNF can be deployed over multiple Virtual Machines (VMs), where each VM hosts a VNFC of the VNF. However, in other cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be piece of software which partitions the underlying physical resources and creates virtual machines, and isolates the virtual machines from each other.

The NFV-MANO entity 128 may be responsible for the operation, management, and coordination of VNF entities 108 and the respective NFVI entity 126. The NFV-MANO entity 128 may comprise an NFV Orchestrator (NFVO) entity 102, one or more VNF manager (VNFM) entities 104, and one or more Virtualized Infrastructure Manager (VIM) entities 106. The NFVO entity 102 can manage the network service (NS) lifecycle and coordinates the management of NS lifecycle, VNF lifecycle (supported by the VNFM entity 104) and NFVI resources (supported by the VIM entity 106) to ensure an optimized allocation of the necessary resources and connectivity. The VNFM entity 104 may communicate with VNF entities 108 and be responsible for VNF lifecycle management (e.g. instantiation, update, query, scaling, and termination). For example, in one embodiment a VNFM entity 104 may be deployed for each VNF entity 108. In some cases, a VNFM entity 104 may serve multiple VNF entities 108. The VIM entity 106 can be responsible for controlling and managing the NFVI compute, storage and network resources. In other words, the VIM entity 106 may be configured to control and manage the interaction of a VNF entity 108 with the compute, storage and network resources in NFVI entity 126. For example, the VIM entity 106 may perform resource management functions, such as management of infrastructure resource and allocation (e.g. increase resources to VMs, improve energy efficiency, and resource reclamation). The VIM entity 106 and the VNFM entity 104 may communicate with each other for resource allocation requests and to exchange virtualized hardware resource configuration and state information.

The NFVI entity 126 represents various hardware and software components which build up the environment in which VNFs are deployed, managed and executed. For example, the hardware components in the NFVI entity 126 may include computing hardware 112, storage hardware 114, and network hardware 116 that provide processing, storage and connectivity to VNF entities 108 through a virtualization layer 130. The computing hardware 112 may be any device configured to, designed to, or otherwise enabled to provide processing and computing resources. The storage hardware 114 may be any kind of device which is used to store information for later retrieval. Examples of storage devices include flash memory, magnetic rotation disks, optical disks, or any other mechanism capable of storing information for later retrieval. Storage hardware 114 may be differentiated between shared network attached storage (NAS) and local storage that is connected directly to the NFVI using an internal bus or other attachment mechanism. In one embodiment, the resources from the computing hardware 112 and storage hardware 114 may be pooled together. The network hardware 116 may be switches that is configured to perform switching functions, e.g. routers, and wired or wireless links. The network hardware 116 may span across a plurality of network domains.

The virtualization layer 130 within the NFVI entity 126 may abstract the hardware resources, i.e., computing hardware 112, storage hardware 114, and network hardware 116 and decouple one or more of the VNF entities 108 from the underlying hardware. For example, the virtualization layer 130 may be responsible for abstracting and logically partitioning hardware resources, enabling the software that implements the VNF to use the underlying virtualized infrastructure, and providing virtualized resources to the VNF entity 108. The virtualized resources controlled by the Virtualization Layer 130 may include a virtual computing 110, a virtual storage 118, and a virtual network 120.

Normally in the NFV system 100 as illustrated in FIG. 1, the VNF entity 108 and the NFV-MANO entity 128 may be provided by different vendors. Therefore, when a VNF provider request special IP address allocation scheme for specific VNFC instance, there is a need of a mechanism which may make the NFV-MANO entity 128 to support such request and implement IP address allocation for VNF.

Figure 2:
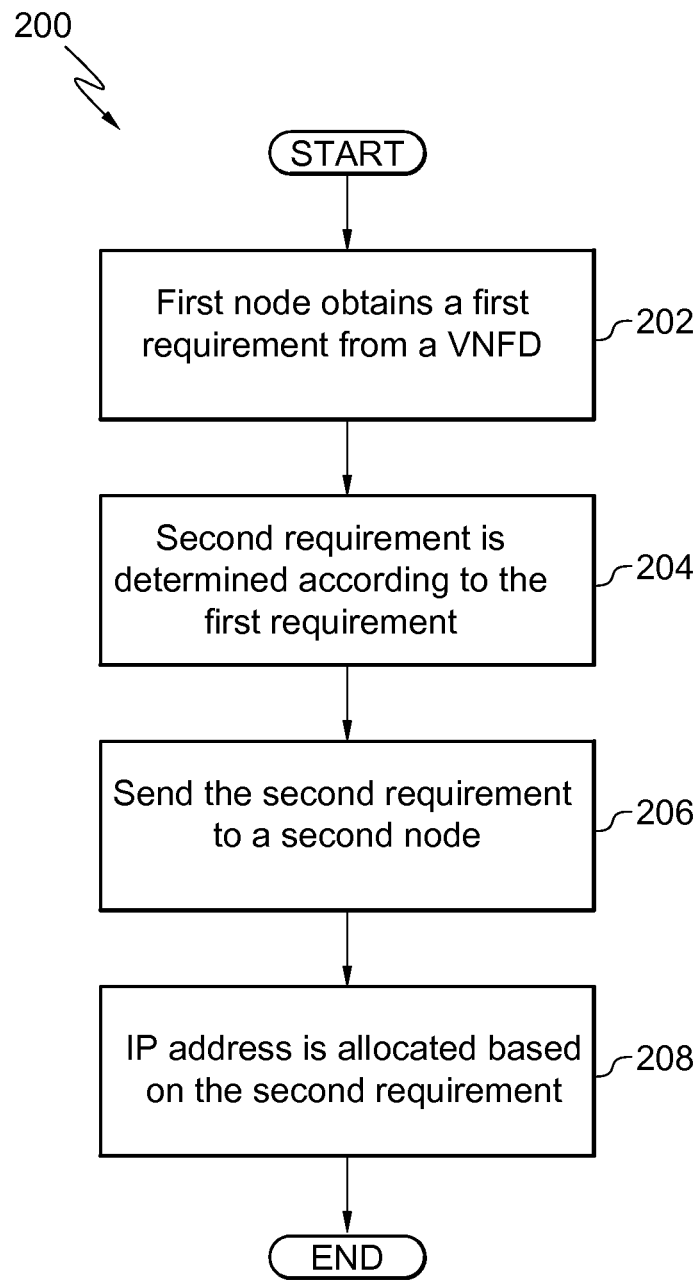
FIG. 2 illustrates a flow diagram of an embodiment of a method for allocating an IP address for an instance in an NFV system.

FIG. 2 illustrates a flow diagram of an embodiment of a method 200 for allocating an IP address for an instance in an NFV system. For example, the embodiment method 200 may be implemented in the context of the NFV system as illustrated in FIG. 1.

At operation 202, a first node in the NFV system obtains a first requirement of IP address allocation for the instance from a virtualised network function descriptor (VNFD). The instance may be a VNFC instance. However, in some cases, the instance may be a VNF instance. In an example embodiment, the first node may be any suitable entity in the NFV system. For example, the first node may be an NFVO entity or a VNFM entity.

In some embodiments, the first requirement may be obtained from a network service descriptor (NSD), instead of a VNFD. The NSD may be a deployment template for a network service referencing all other descriptors which describe components that are part of that network service.

In one example embodiment, the VNFD may be a deployment template which describes a VNF in terms of its deployment and operational behavior requirements. In some implementations, the VNFD may be used by the VNFM entity in the process of VNF instantiation and lifecycle management of a VNF instance. The VNFD can be also used by the NFVO entity to manage and orchestrate Network Services and virtualised resources on an NFVI entity. The VNFD can also contain connectivity, interface and KPIs requirements that can be used by an NFV-MANO entity to establish appropriate Virtual Links within the NFVI entity between its VNFC instances, or between a VNF instance and the endpoint interface to the other Network Functions.

At operation 204, a second requirement of IP address allocation for the instance is determined by the first node according to the first requirement obtained from the VNFD.

At operation 206, the first node sends the second requirement of IP address allocation for the instance to a second node in the NFV system. In an example embodiment, the second node may be any suitable entity in the NFV system. For example, the second node may be a VIM entity.

At operation 208, the IP address for the instance is allocated based on the second requirement received. In some embodiments, the second node allocates the IP address.

According to the embodiment of FIG. 2, an efficient mechanism is provided for the nodes from different vendors in the NFV system to coordinate special requests of IP address allocation scheme for specific instance and implement IP address allocation for VNF.

Figure 3:
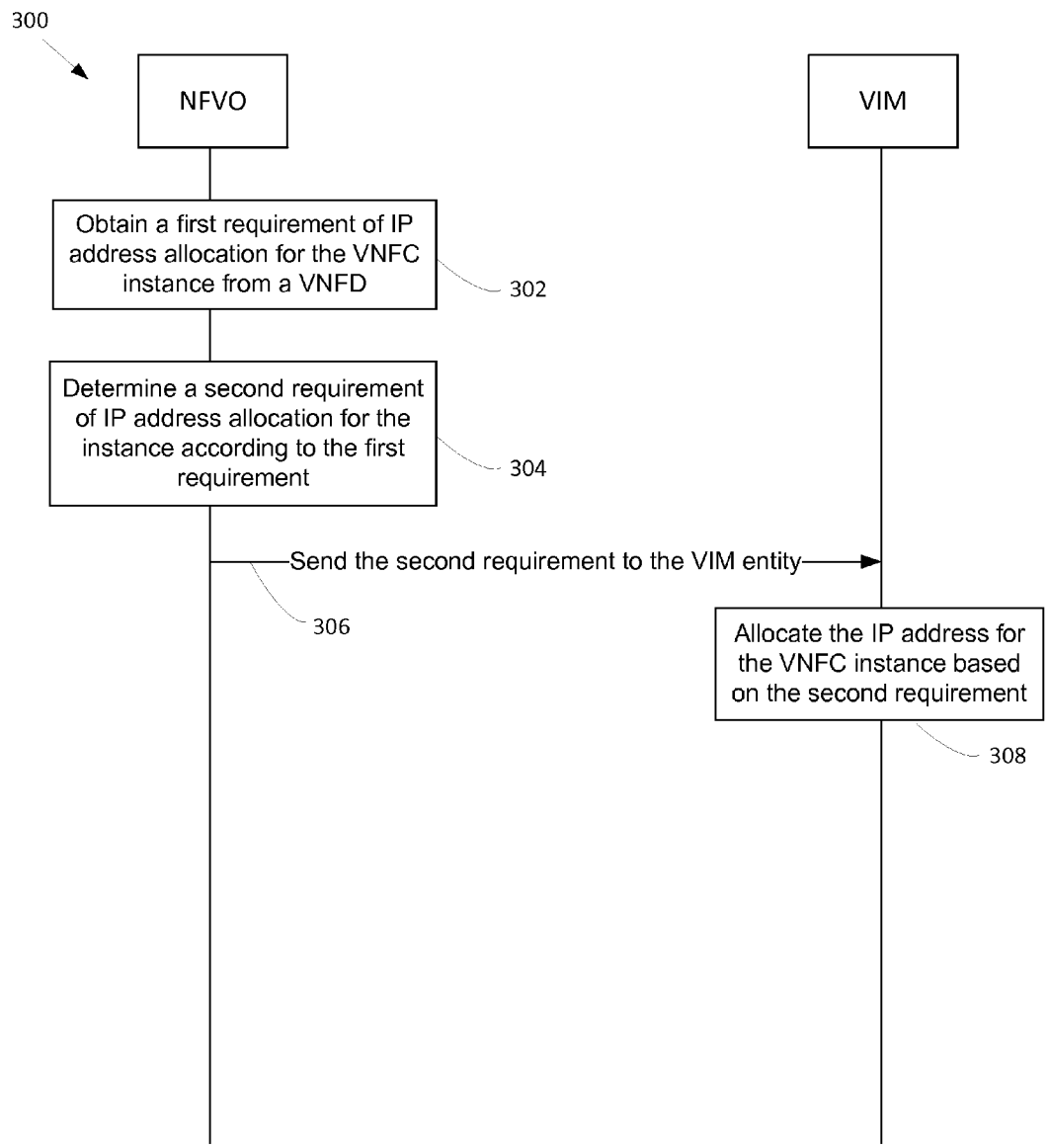
FIG. 3 illustrates a flow diagram of an embodiment of a method for statically allocating an IP address for an VNFC instance in an NFV system.

In order to better describe the embodiment shown in FIG. 2, FIG. 3 illustrates a flow diagram of an embodiment of a method 300 for statically allocating an IP address for an VNFC instance in an NFV system.

It is understood that the embodiment method 300 may be implemented in the context of the NFV system as illustrated in FIG. 1. This static allocation method embodiment, for example, may be implemented during instantiation or scaling process. The scaling ability may comprise scaling out ability to scale by add resource instances. In other cases, the scaling ability may comprise scaling up ability to scale by changing allocated resource, e.g. increase memory, CPU capacity or storage size.

At operation 302, an NFVO entity obtains a first requirement of IP address allocation for the VNFC instance from a VNFD. The first requirement may indicate one or more characteristics of the IP address to be allocated, and the one or more characteristics may be specified and pre-defined in the VNFD.

The one or more characteristics, for example, may include an IP address type indicator, an access point name (APN) indicator, an IP address pool indicator, an IP address range indicator, an IP address list indicator, a port indicator, or any combination thereof.

The IP address type indicator may indicate the type of the IP address to be allocated. For example, the IP address type indicator may be a public IP address indicator indicating the IP address to be allocated is a public IP address. In another example, the IP address type indicator may be a private IP address indicator indicating the IP address to be allocated is a private IP address.

The APN indicator may indicate an APN which the IP address to be allocated belongs to. It is understood that for a given APN a range of IP addresses may be assigned to the APN. The use of the IP addresses may allow for the APN to be determined by the IP address using a table or other mechanism.

The IP address pool indicator may indicate an IP address pool which the IP address to be allocated belongs to. In one example, a pool may be 192.168.x.x, where x is an integer from 0-255. The pool may encompass all addresses that conform to the pool definition.

The IP address range indicator may indicate an IP address range constraint within which the IP address to be allocated is. In some embodiments, a predefined range may be preferable because of restricted addresses (for example, it is contemplated that in some networks all IP addresses that are x.x.0.1 are reserved for a specific routing purpose). In some embodiments, the range constraint may be specified by a value range or a specific text which describes a requirement of the IP address to be allocated, for example, policy-based requirement, security requirement, or location requirement.

The IP address list indicator may indicate a list of specific IP addresses in which the IP address to be allocated is, where the list may include at least one IP address. This may be a "white list" of acceptable IP addresses. This may be important for internet facing networks where there are discontinuous IP ranges available for use.

The port indicator may indicate an allowed port associated with the IP address for the instance. In other words, a particular port associated with the IP address is specified to be used to communicate for the instance, in order to provide an additional level of security for the instance.

It is understood that the one or more characteristics may be implemented in any desired form to specify the requirement of the IP address to be allocated to the VNFC instance.

It is also understood that to the extent the term "indicate" is used in the specification or claims, it is intended to mean not only "explicitly indicate" but also "implicitly indicate".

In one example embodiment, the indicator may not be specified as default based on the pre-defined agreement, e.g. to implicitly indicate the VNF has no specific requirement on IP address allocation, or VNF will allocate IP address for itself after the VNF or VNFC instance is created.

With respect to the implementation that the one or more characteristics may include the IP address pool indicator, a range of IP addresses in a subnet as an IP address pool may be reserved for a VNFC instance or VNF instance. According to the IP address pool indicator, the IP address for the VNFC instance will be allocated from the IP address pool. Even after the IP address allocated for the VNFC instance is released during scaling in phase, the IP address in the pool is still reserved.

As described in the above-mentioned embodiments, the VNFD is a deployment template which describes a VNF in terms of deployment and operational behavior requirements. With regard to other definition of the VNFD, reference can be made to the above-mentioned embodiments. In an example embodiment, the requirements may be pre-defined by the VNF provider in the VNFD. The NFVO may on-board all descriptors including VNFD which is on-boarded in a VNF catalogue, as part of a VNF Package. Table 1 lists an example of the base information elements in the VNFD.

TABLE 1

| Identifier | Type | Cardinality |
| --- | --- | --- |
| Id | Leaf | 1 |
| vendor | Leaf | 1 |
| descriptor_version | Leaf | 1 |
| version | Leaf | 1 |
| vdu | Element | 1 . . . N |
| virtual_link | Element | 0 . . . N |
| connection_point | Element | 1 . . . N |
| lifecycle_event | Leaf | 0 . . . N |
| dependency | Leaf | 0 . . . N |
| monitoring_parameter | Leaf | 0 . . . N |
| deployment_flavour | Element | 1 . . . N |
| auto_scale_policy | Leaf | 0 . . . N |
| manifest_file | Leaf | 0 . . . 1 |
| manifest_file_security | Leaf | 0 . . . N |

In an example embodiment, referring to Table 1, the first requirement of IP address allocation for the instance may be pre-defined in a virtual deployment unit (VDU) information element in the VNFD (vnfd:vdu). Information elements concerning the VDU are defined in Table 2 below.

TABLE 2

| Identifier | Type | Cardinality |
| --- | --- | --- |
| id | Leaf | 1 |
| vm_image | Leaf | 0 . . . 1 |
| computation_requirement | Leaf | 1 |
| virtual_memory_resource_element | Leaf | 1 |
| virtual_network_bandwidth_resource | Leaf | 1 |

TABLE 2-continued

| Identifier | Type | Cardinality |
| --- | --- | --- |
| lifecycle_event | Leaf | 0 . . . N |
| constraint | Leaf | 0 . . . 1 |
| high_availability | Leaf | 0 . . . 1 |
| scale_in_out | Leaf | 0 . . . 1 |
| vnfc | Element | 1 . . . N |
| monitoring_parameter | Leaf | 0 . . . N |

In an example embodiment, the first requirement of IP address allocation for the instance may be pre-defined in a VNFC information element in the VDU (vnfd:vdu:vnfc). In an implementation, the first requirement may be pre-defined in a connection_point information element in the VNFC information element (vnfd:vdu:vnfc:connectionpoint). For example, an IP address leaf may be used to carry the first requirement in the connection_point information element (vnfd:vdu:vnfc:connection_point). Of course, the first requirement may be implemented in the VNFD for any suitable location.

At operation 304, the NFVO entity determines a second requirement of IP address allocation for the instance according to the first requirement obtained from the VNFD. In an example embodiment, the NFVO entity may determine the second requirement as required by the first requirement obtained from the VNFD. In another embodiment, the NFVO entity may determine the second requirement as the same of the first requirement obtained from the VNFD, or substantially similar to the first requirement obtained from the VNFD.

The second requirement accordingly may indicate one or more characteristics of the IP address to be allocated. The one or more characteristics indicated in the second requirement, for example, may include an IP address type indicator, an APN indicator, an IP address pool indicator, an IP address range indicator, an IP address list indicator, a port indicator, or any combination thereof. With respect to the definition and the detailed implementation of the characteristics, reference can be made to the above-mentioned description for the sake of conciseness.

At operation 306, the NFVO entity sends the second requirement of IP address allocation for the VNFC instance to a VIM entity. For example, the NFVO entity may send a request carrying the second requirement to the VIM entity during instantiation or scaling process.

At operation 308, the VIM entity allocates the IP address for the VNFC instance based on the second requirement received from the NFVO entity. And then the VNFC instance may be instantiated and operated normally.

In one implementation, if the one or more characteristics indicated in the second requirement include the IP address type indicator, then the VIM entity will allocate the IP address with the specific type as required in the IP address type indicator for the VNFC instance.

In one implementation, if the one or more characteristics indicated in the second requirement include the APN indicator, then the VIM entity will allocate the IP address which belongs to the APN as required in the APN indicator for the VNFC instance.

In one implementation, if the one or more characteristics indicated in the second requirement include the IP address pool indicator, then the VIM entity will allocate the IP address from the IP address pool as required in the IP address pool indicator for the VNFC instance.

In one implementation, if the one or more characteristics indicated in the second requirement include the IP address range indicator, then the VIM entity will allocate the IP address within the range constraint as required in the IP address range indicator for the VNFC instance.

In one implementation, if the one or more characteristics indicated in the second requirement include the IP address list indicator, then the VIM entity will allocate the IP address from the list of specific IP addresses as required in the IP address list indicator for the VNFC instance.

In one implementation, if the one or more characteristics indicated in the second requirement include the port indicator, then the VIM entity will configure the specified port through which communication associated with the instance will be allowed, thereby providing an additional level of security for the instance.

The use of the NFVO entity and the VIM entity are only an example to facilitate ease of description and explanation. The embodiment of FIG. 3 may be implemented by any suitable entity in the NFV system. For example, the NFVO entity may be replaced by a VNFM entity to achieve similar implementation.

According to the embodiment of FIG. 3, the NFVO entity may obtain the specific requirement for IP address allocation pre-defined in the VNFD and support the specific requirement for IP address allocation from the VNF provider, thereby providing an efficient mechanism to implement IP address allocation.

Figure 4:
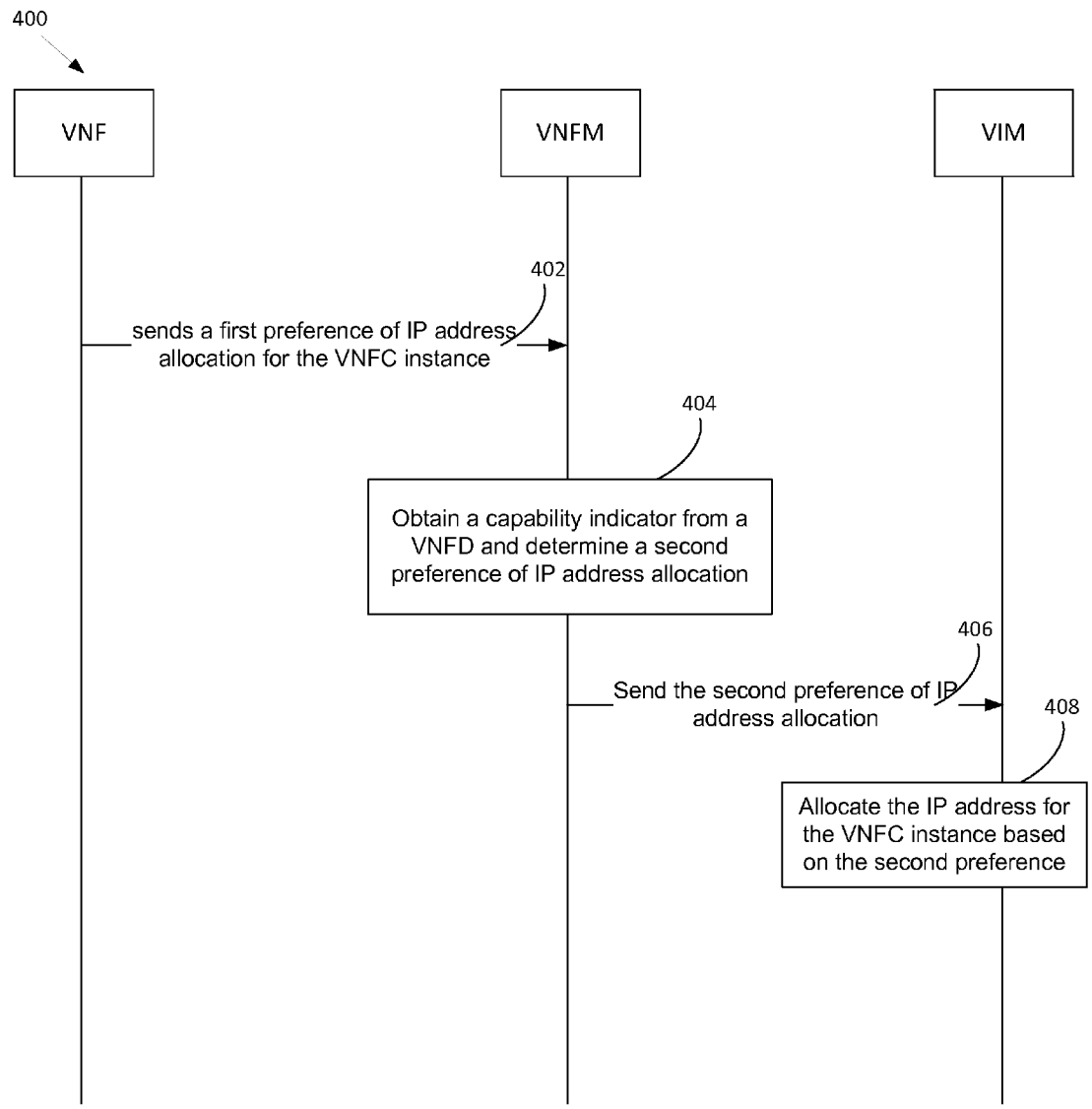
FIG. 4 illustrates a flow diagram of an embodiment of a method for dynamically allocating an IP address for an VNFC instance in an NFV system.

FIG. 4 illustrates a flow diagram of an embodiment of a method 400 for dynamically allocating an IP address for an VNFC instance in an NFV system. For example, the embodiment method 400 may be implemented in the context of the NFV system as illustrated in FIG. 1. This dynamical allocation method embodiment, for example, may be implemented during instantiation or scaling process.

At operation 402, a VNF entity sends a first preference of IP address allocation for the VNFC instance to a VNFM entity through an interface between the VNF entity and the VNFM entity. The first preference may indicate one or more characteristics of the IP address that the VNF entity expects to allocate. The one or more characteristics, for example, may include an IP address type indicator, an APN indicator, an IP address pool indicator, an IP address range indicator, an IP address list indicator, a port indicator, or any combination thereof. With respect to the definition and the detailed implementation of the indicators, reference can be made to the above-mentioned embodiments for the sake of conciseness.

In one example embodiment, the first preference of IP address allocation may be included in a scaling request and sent to the VNFM entity when the VNF entity triggers a VNFC scaling process. In one example embodiment, the first preference may be determined by the VNF entity based on service capability and/or service chaining the VNFC belongs to.

At operation 404, the VNFM entity obtains a capability indicator from a VNFD. The capability indicator may indicate the IP address allocation is to be configured through an interface between nodes in the NFV system during VNF deployment phase. Then the VNFM entity determines a second preference of IP address allocation for the VNFC instance at least based on the capability indicator and the first preference. The second preference, for example, may be determined during a scaling process. In one example embodiment, the second preference may be determined based on the capability indicator, the first preference and operator's policy. In another example embodiment, the second preference may be determined based on the capability indicator, the first preference, operator's policy and VNF forwarding graph (VNF FG).

The second preference may indicate one or more characteristics of the IP address that the VNFM entity expects to allocate. The one or more characteristics, for example, may include an IP address type indicator, an APN indicator, an IP address pool indicator, an IP address range indicator, an IP address list indicator, a port indicator, or any combination thereof.

In some embodiments, in addition to the capability indicator, the VNFD may further include a specification of the IP address allocation for the VNFC instance that indicates one or more characteristics of the IP address to be allocated. The one or more characteristics, for example, may include an IP address type indicator, an APN indicator, an IP address pool indicator, an IP address range indicator, an IP address list indicator, a port indicator, or any combination thereof. The VNFM entity will ignore such specification in the VNFD and will not use such specification to request for IP address allocation according to the capability indicator. In some embodiments, the capability indicator and the specification of the IP address allocation may be combined in one information element or separated into different information elements.

At operation 406, the VNFM entity sends the second preference of IP address allocation to a VIM entity through an interface between the VNFM entity and the VIM entity.

In one example embodiment, the second preference of IP address allocation may be included in a scaling request sent to the VIM entity during a scaling process.

At operation 408, the VIM entity allocates the IP address for the VNFC instance based on the second preference received from the NFVO entity. And then the VNFC instance may be instantiated and operated normally. With respect to the detailed implementation of the allocation, reference can be made to the above-mentioned embodiments for the sake of conciseness.

In one example embodiment, the first and the second preferences may be conveyed in the information elements through certain operation or configurations interfaces between the nodes in the NFV system. For example, the interface may include VNF lifecycle management interface, VNF lifecycle change management interface, VNF configuration management interface, virtualized resource capability management interface.

The use of the VNF entity, the VNFM entity and the VIM entity are only an example to facilitate ease of description and explanation. The embodiment of FIG. 4 may be implemented by any suitable entity in the NFV system.

In some embodiments, operation 402 may be omitted. Then at operation 404, the VNFM entity obtains the capability indicator from the VNFD. The VNFM entity then determines the second preference at least based on the capability indicator. At operation 406, the VNFM entity sends the second preference to the VIM entity through an interface between the VNFM entity and the VIM entity. At operation 408, the VIM entity allocates the IP address for the VNFC instance based on the second preference. With regard to the detailed implementations, reference can be made to the above-mentioned embodiments, with their combination and modification falling within the scope of the present disclosure.

In the embodiment of FIG. 3, the requirement of IP address allocation is pre-defined in VNFD before the start of the VNF or during VNF design phase. As opposed to the embodiment of FIG. 3, the embodiment of FIG. 4 may implement some algorithm or other method to dynamically determine the IP address requirement for its VNFC instance during VNF deployment phase. More flexibility and intelligent on IP address allocation for VNF is provided.

Figure 5:
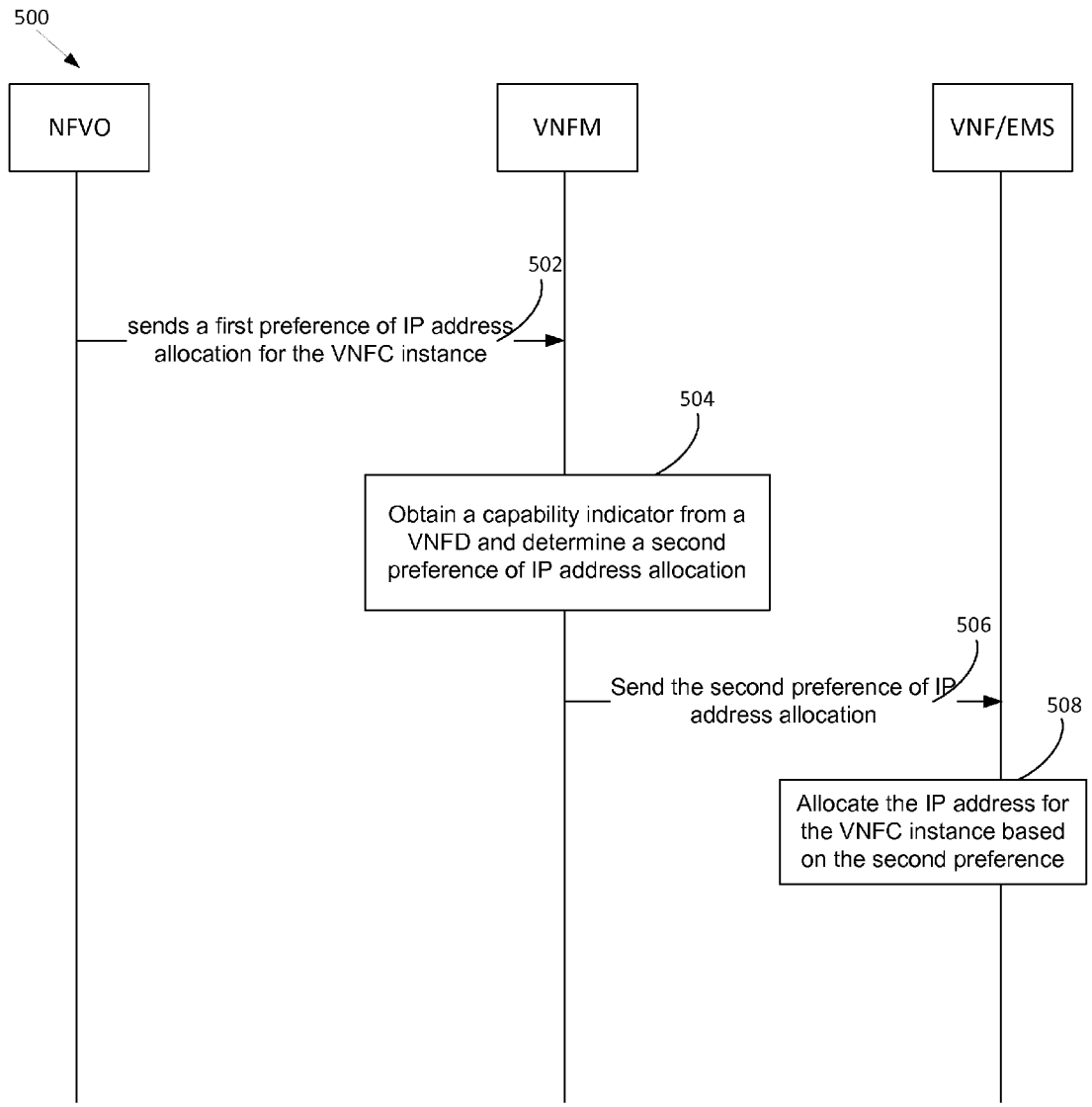
FIG. 5 illustrates a flow diagram of another embodiment of a method for dynamically allocating an IP address for an VNFC instance in an NFV system.

FIG. 5 illustrates a flow diagram of another embodiment of a method 500 for dynamically allocating an IP address for a VNFC instance in an NFV system. The main difference between the embodiment of FIG. 5 and the above-mentioned embodiment of FIG. 4 lies in that the NFVO entity sends the first reference of IP address allocation for the VNFC instance to the VNFM entity, and that the VNFM entity determines and sends the second reference of IP address allocation to the VNF entity or EMS which allocates the IP address for the VNFC instance. With regard to the other implementations of the embodiment of FIG. 5, reference can be made to the above-mentioned embodiments, with their combination and modification falling within the scope of the present disclosure. In message 502, the NFVO entity sends a first preference of an IP address allocation for the VNFC instance to the VNFM entity. In block 504 the VNFM entity obtains a capability indicator from a VNFD and determines a second preference of an IP address allocation. Message 506 is sent from the VNFM entity to the VNF/EMS and comprises a second preference of IP address allocation. In block 508 the VNF/EMS allocates the IP address for the VNFC instance based upon the second preference.

Figure 6:
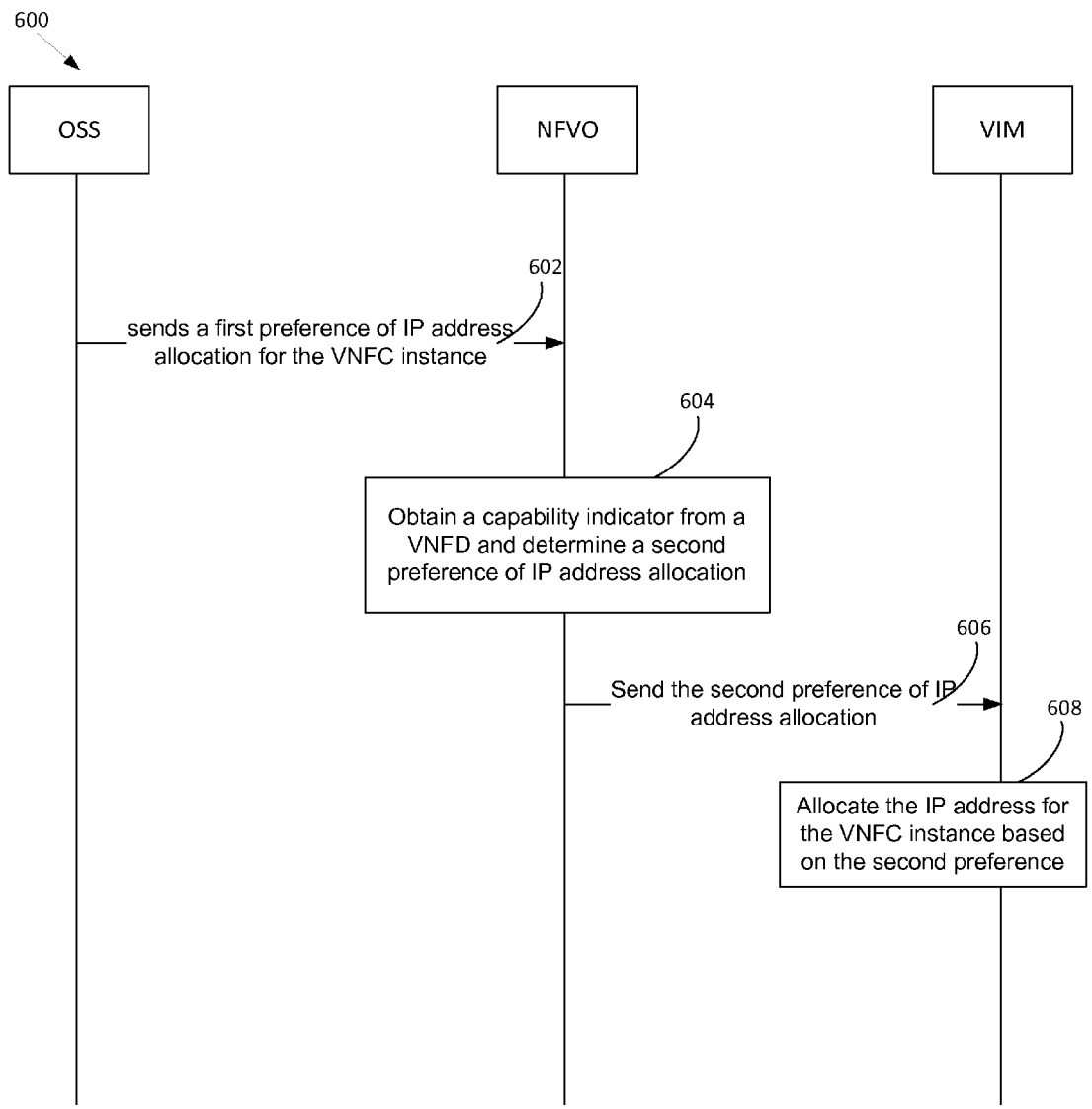
FIG. 6 illustrates a flow diagram of another embodiment of a method for dynamically allocating an IP address for an VNFC instance in an NFV system.

FIG. 6 illustrates a flow diagram of another embodiment of a method 600 for dynamically allocating an IP address for a VNFC instance in an NFV system. The main difference between the embodiment of FIG. 6 and the above-mentioned embodiment of FIG. 4 lies in that the OSS or other authorized management entity sends the first reference of IP address allocation for the VNFC instance to the NFVO entity, and that the NFVO entity determines and sends the second reference of IP address allocation to the VIM entity which allocates the IP address for the VNFC instance. With regard to the other implementations of the embodiment of FIG. 6, reference can be made to the above-mentioned embodiments, with their combination and modification falling within the scope of the present disclosure. In message 602, the OSS sends a first preference of an IP address allocation for the VNFC instance to the NFVO entity. In block 604 the NFVO entity obtains a capability indicator from a VNFD and determines a second preference of an IP address allocation. Message 606 is sent from the NFVO entity to the VIM entity and comprises a second preference of IP address allocation. In block 608 the VIM entity allocates the IP address for the VNFC instance based upon the second preference.

Figure 7:
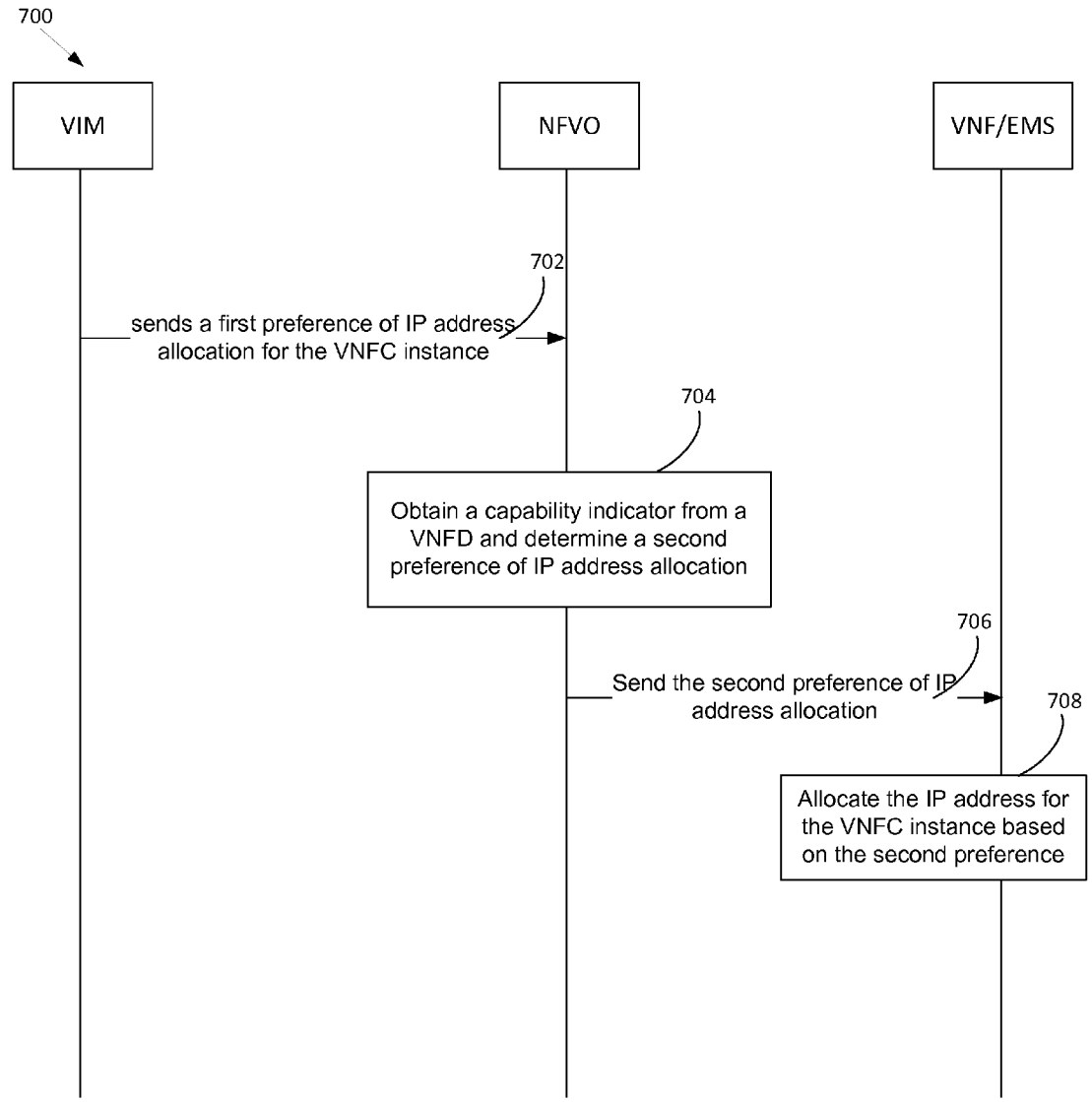
FIG. 7 illustrates a flow diagram of another embodiment of a method for dynamically allocating an IP address for an VNFC instance in an NFV system.

FIG. 7 illustrates a flow diagram of another embodiment of a method 700 for dynamically allocating an IP address for a VNFC instance in an NFV system. The main difference between the embodiment of FIG. 7 and the above-mentioned embodiment of FIG. 4 lies in that the VIM entity sends the first reference of IP address allocation for the VNFC instance to the NFVO entity, and that the NFVO entity determines and sends the second reference of IP address allocation to the VNF entity or EMS which allocates the IP address for the VNFC instance. With regard to the other implementations of the embodiment of FIG. 7, reference can be made to the above-mentioned embodiments, with their combination and modification falling within the scope of the present disclosure. In message 702, the VIM entity sends a first preference of an IP address allocation for the VNFC instance to the NFVO entity. In block 704 the NFVO entity obtains a capability indicator from a VNFD and determines a second preference of an IP address allocation. Message 706 is sent from the NFVO entity to the VNF entity or EMS and comprises a second preference of IP address allocation. In block 708 the VNF entity or EMS allocates the IP address for the VNFC instance based upon the second preference.

Figure 8:
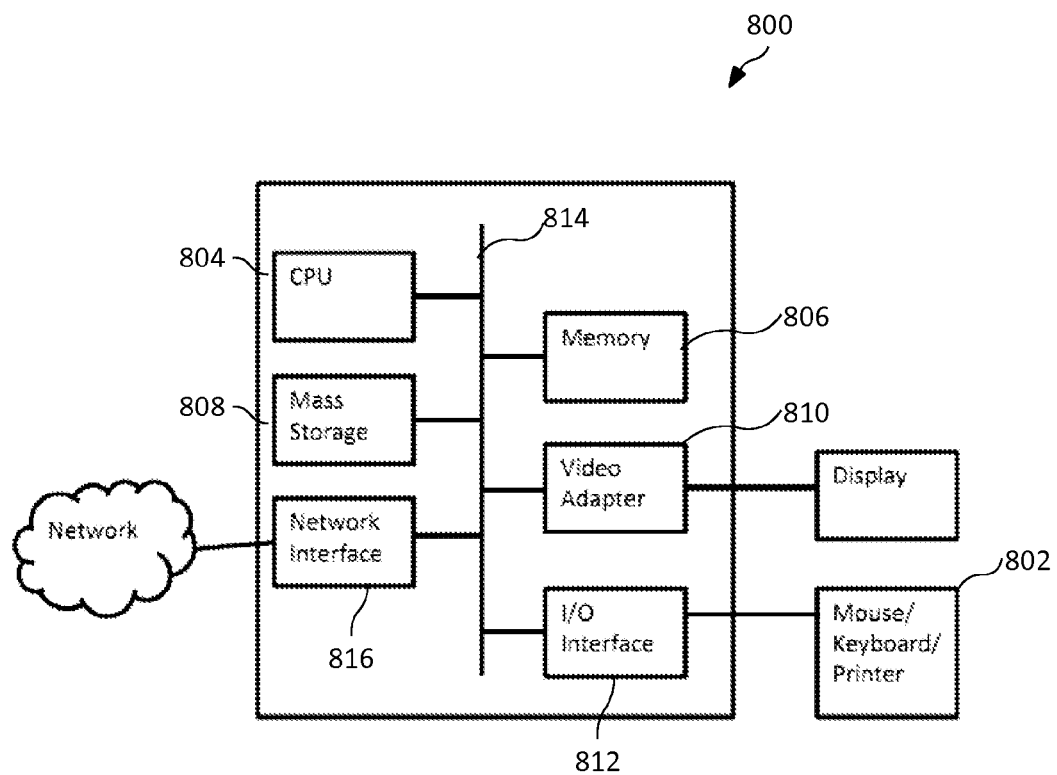
FIG. 8 illustrates a computing platform that may be used for implementing, for example, the devices and methods described herein, in accordance with an embodiment.

FIG. 8 is a block diagram of a processing system 800 that may be used for implementing the devices and methods disclosed herein. System 800 may be used in any hardware with functionality that is discussed in FIG. 1 or may be located in support functions (not shown). Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices 802, such as a speaker, microphone, mouse, touchscreen, keypad, keyboard, printer, display, and the like. The processing unit may include a central processing unit (CPU) 804, memory 806, a mass storage device 808, a video adapter 810, and an I/O interface 812 connected to a bus 814.

The bus 814 may be one or more of any type of several bus architectures including a memory bus or memory controller, a peripheral bus, video bus, or the like. The CPU 804 may comprise any type of electronic data processor. The memory 806 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 806 may include ROM for use at boot-up, and DRAM for program and data storage for use while executing programs.

The mass storage device 808 may comprise any type of non-transitory storage device configured to store data, programs, and other information and to make the data, programs, and other information accessible via the bus. The mass storage device 808 may comprise, for example, one or more of a solid state drive, hard disk drive, a magnetic disk drive, an optical disk drive, or the like.

The video adapter 810 and the I/O interface 812 provide interfaces to couple external input and output devices to the processing unit. As illustrated, examples of input and output devices include the display coupled to the video adapter 810 and the mouse/keyboard/printer coupled to the I/O interface 812. Other devices may be coupled to the processing system 800, and additional or fewer interface devices may be utilized. For example, a serial interface such as Universal Serial Bus (USB) (not shown) may be used to provide an interface for a printer.

The processing system 800 also includes one or more network interfaces 816, which may comprise wired links, such as an Ethernet cable or the like, and/or wireless links to access nodes or different networks. The network interface 816 allows the processing system 800 to communicate with remote units via the networks. For example, the network interface 816 may provide wireless communication via one or more transmitters/transmit antennas and one or more receivers/receive antennas. In an embodiment, the processing system 800 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. For example, the embodiments described above may use addressing based upon IPv4, but it is expressly contemplated that other addressing, such as IPv6 may be used.

What is claimed is:

1. A method for allocating an IP address for an instance in a network function virtualization (NFV) system, comprising:
   obtaining, by a first node in the NFV system, a first requirement of IP address allocation for the instance from a virtualised network function descriptor (VNFD);
   determining, by the first node, a second requirement of IP address allocation for the instance according to the first requirement; and
   sending, by the first node, to a second node in the NFV system the second requirement, wherein the IP address is allocated for the instance based upon the second requirement.

2. The method of claim 1, wherein the instance comprises a virtualised network function (VNF) instance or a virtualised network function component (VNFC) instance.

3. The method of claim 1, wherein the first requirement is included in a virtual deployment unit (VDU) information element in the VNFD.

4. The method of claim 1, wherein the method further comprises: allocating, by the second node, the IP address for the instance based on the second requirement.

5. The method of claim 1, wherein the first requirement and the second requirement respectively indicate one or more characteristics of the IP address to be allocated, and wherein the one or more characteristics indicated in the first requirement are pre-defined in the VNFD.

6. The method of claim 5, wherein the first node is a NFV orchestrator (NFVO) entity or a VNF manager (VNFM) entity, and the second node is a virtualized infrastructure manager (VIM) entity.

7. The method of claim 5, wherein the one or more characteristics of the IP address comprises at least one type from a group of:
   an IP address type indicator indicating the type of the IP address to be allocated;
   an access point name (APN) indicator indicating an APN which the IP address to be allocated belongs to;
   an IP address pool indicator indicating an IP address pool which the IP address to be allocated belongs to;
   an IP address range indicator indicating an IP address range constraint within which the IP address to be allocated is;
   an IP address list indicator indicating a list of specific IP addresses in which the IP address to be allocated is; and
   a port indicator indicating an allowed port associated with the IP address for the instance.

8. The method of claim 1, wherein the method further comprises:
   receiving, by the first node, a third requirement of IP address allocation for the instance from a third node in the NFV system through an interface between the first node and the third node; and
   wherein the first requirement indicates the IP address allocation is to be configured through an interface between nodes in the NFV system, the second requirement indicates one or more characteristics of the IP address that the first node expects to allocate, the third requirement indicates one or more characteristics of the IP address that the third node expects to allocate, and the determining the second requirement of IP address allocation for the instance according to the first requirement comprises:
determining the second requirement at least based on the first and third requirement.

9. The method of claim 8, wherein the second requirement is sent through an interface between the first node and the second node in the NFV system.

10. The method of claim 8, wherein the first node is a VNFM entity, the second node is a VIM entity and the third node is a VNF entity; wherein the first node is a VNFM entity, the second node is a VNF entity or an element management system (EMS), and the third node is a NFVO entity; wherein the first node is an NFVO entity, the second node is a VIM entity and the third node is an OSS entity or other authorized management entity; or wherein the first node is an NFVO entity, the second node is a VNF entity or an EMS, and the third node is a VIM entity.

11. The method of claim 8, wherein the one or more characteristics of the IP address comprises at least one type from a group of:
an IP address type indicator indicating the type of the IP address to be allocated;
an APN indicator indicating an APN which the IP address to be allocated belongs to;
an IP address pool indicator indicating an IP address pool which the IP address to be allocated belongs to;
an IP address range indicator indicating an IP address range constraint within which the IP address to be allocated is;
an IP address list indicator indicating a list of specific IP addresses in which the IP address to be allocated is; and
a port indicator indicating an allowed port associated with the IP address for the instance.

12. The method of claim 1, wherein the first requirement indicates the IP address allocation is to be configured through an interface between nodes in the NFV system, the second requirements indicates one or more characteristics of the IP address that the first node expects to allocate.

13. A system, comprising:
a memory that stores at least one range of IP addresses;
a processor that receives a request for an IP address for an instance in a Network Function Virtualization (NFV) system, wherein the processor allocates the IP address by obtaining a first requirement of IP address allocation for the instance from a virtualised network function descriptor (VNFD) and a second requirement of IP address allocation for the instance according to the first requirement, and
an interface connected to the processor that sends a selected IP address to the instance based upon the second requirement.

14. The system of claim 13, wherein the first requirement is included in a virtual deployment unit (VDU) information element in the VNFD.

15. The system of claim 13, wherein the first requirement and the second requirement respectively indicate one or more characteristics of the IP address to be allocated, and wherein the one or more characteristics indicated in the first requirement are pre-defined in the VNFD.

16. The system of claim 15, wherein the one or more characteristics of the IP address comprises at least one type from a group of:
an IP address type indicator indicating the type of the IP address to be allocated;
an access point name (APN) indicator indicating an APN which the IP address to be allocated belongs to;
an IP address pool indicator indicating an IP address pool which the IP address to be allocated belongs to;
an IP address range indicator indicating an IP address range constraint within which the IP address to be allocated is;
an IP address list indicator indicating a list of specific IP addresses in which the IP address to be allocated is; and
a port indicator indicating an allowed port associated with the IP address for the instance.

17. A system, comprising:
a memory storing instructions; and
a processor coupled to the memory, wherein when the processor executes the instructions, the instructions instruct the processor to:
obtain a first requirement of IP address allocation for the instance from a virtualised network function descriptor (VNFD) in a network function virtualization (NFV) system;
determine a second requirement of IP address allocation for the instance according to the first requirement; and
send the second requirement to a node that allocates the IP address for the instance based upon the second requirement in the NFV system.

18. The system of claim 17, wherein the first requirement is included in a virtual deployment unit (VDU) information element in the VNFD.

19. The system of claim 17, wherein the first requirement and the second requirement respectively indicate one or more characteristics of the IP address to be allocated, and wherein the one or more characteristics indicated in the first requirement are pre-defined in the VNFD.

20. The system of claim 19, wherein the one or more characteristics of the IP address comprises at least one type from a group of:
an IP address type indicator indicating the type of the IP address to be allocated;
an access point name (APN) indicator indicating an APN which the IP address to be allocated belongs to;
an IP address pool indicator indicating an IP address pool which the IP address to be allocated belongs to;
an IP address range indicator indicating an IP address range constraint within which the IP address to be allocated is;
an IP address list indicator indicating a list of specific IP addresses in which the IP address to be allocated is; and
a port indicator indicating an allowed port associated with the IP address for the instance.

* * * * *